(12) United States Patent
Chiproot

(10) Patent No.: US 8,960,729 B2
(45) Date of Patent: Feb. 24, 2015

(54) CLAMP ASSEMBLY WITH ANNULAR CLAMPS AND BRIDGE

(75) Inventor: Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 285 days.

(21) Appl. No.: 13/326,360

(22) Filed: Dec. 15, 2011

(65) Prior Publication Data

US 2013/0154259 A1  Jun. 20, 2013

(51) Int. Cl.
*F16L 21/06* (2006.01)
(52) U.S. Cl.
USPC ............ 285/421; 285/343; 285/369; 285/323
(58) Field of Classification Search
USPC ................... 285/420, 343, 369, 323, 421
See application file for complete search history.

(56) References Cited

U.S. PATENT DOCUMENTS

| | | | |
|---|---|---|---|
| 2,413,927 A | 1/1947 | Robertson | |
| 4,659,870 A * | 4/1987 | Jones | 174/84 S |
| 6,293,556 B1 * | 9/2001 | Krausz | 277/549 |
| 8,528,945 B2 * | 9/2013 | Bird et al. | 285/369 |
| 2003/0127858 A1 * | 7/2003 | Chiproot et al. | 285/373 |
| 2007/0273151 A1 * | 11/2007 | Krausz et al. | 285/406 |
| 2009/0140520 A1 * | 6/2009 | Krausz et al. | 285/340 |
| 2011/0031737 A1 | 2/2011 | Krausz | |
| 2012/0145270 A1 | 6/2012 | Krausz | |
| 2012/0299293 A1 | 11/2012 | Chiproot | |

FOREIGN PATENT DOCUMENTS

| | | |
|---|---|---|
| DE | 4428572 | 2/1996 |
| EP | 2463567 | 6/2012 |
| WO | 03/071178 | 8/2003 |
| WO | 20121162454 | 11/2012 |

OTHER PUBLICATIONS

PCT Written Opinion PCT/US2012/068870, mailed Jul. 8, 2013, received Jul. 16, 2013.

\* cited by examiner

*Primary Examiner* — David E Bochna
(74) *Attorney, Agent, or Firm* — Dekel Patent Ltd.; David Klein

(57) ABSTRACT

An improved clamp assembly that has two adjacent annular clamps and the user has the choice of tightening just one of them or both of them. A bridge element is provided that presses against one or more sealing rings when tightening the annular clamp.

7 Claims, 4 Drawing Sheets

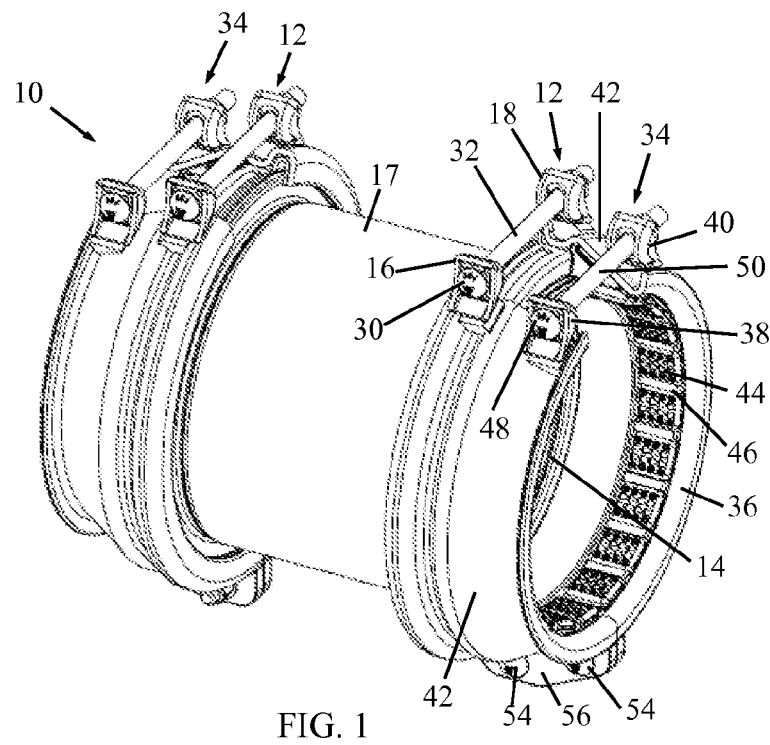
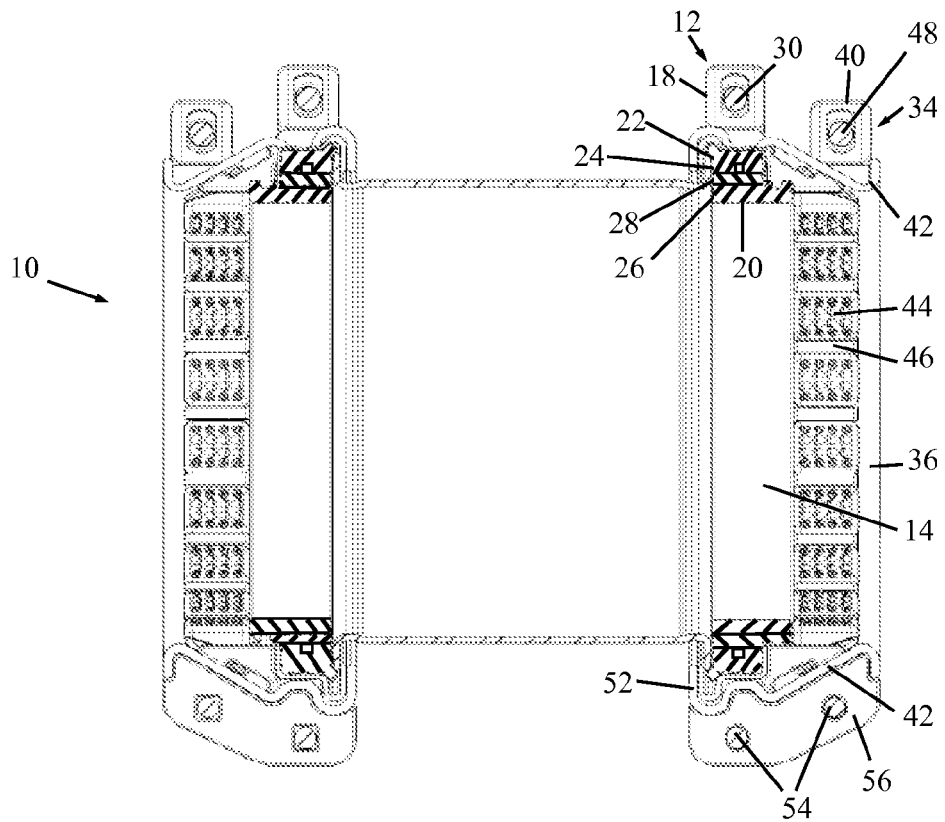
FIG. 1
FIG. 2

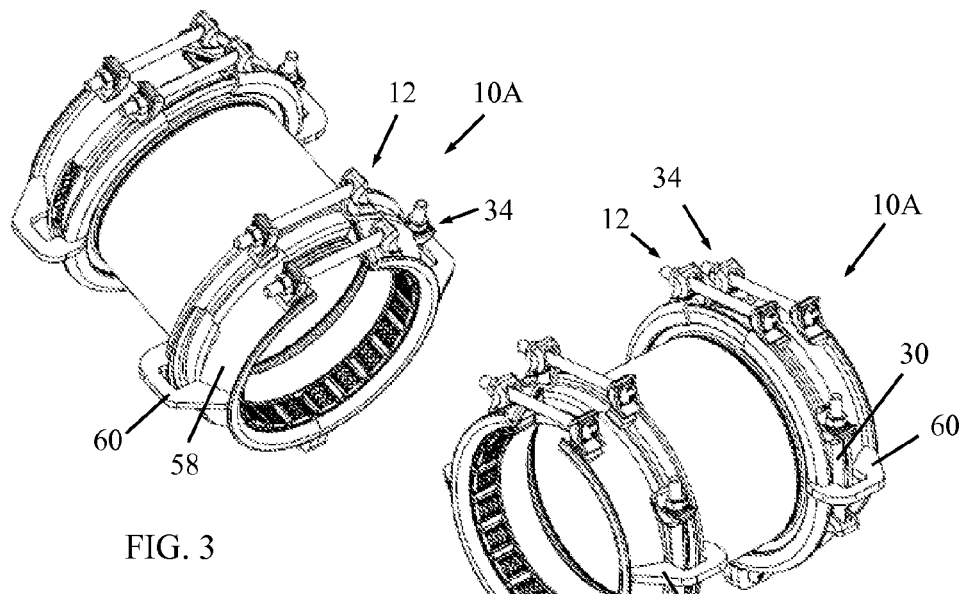
FIG. 3
FIG. 4
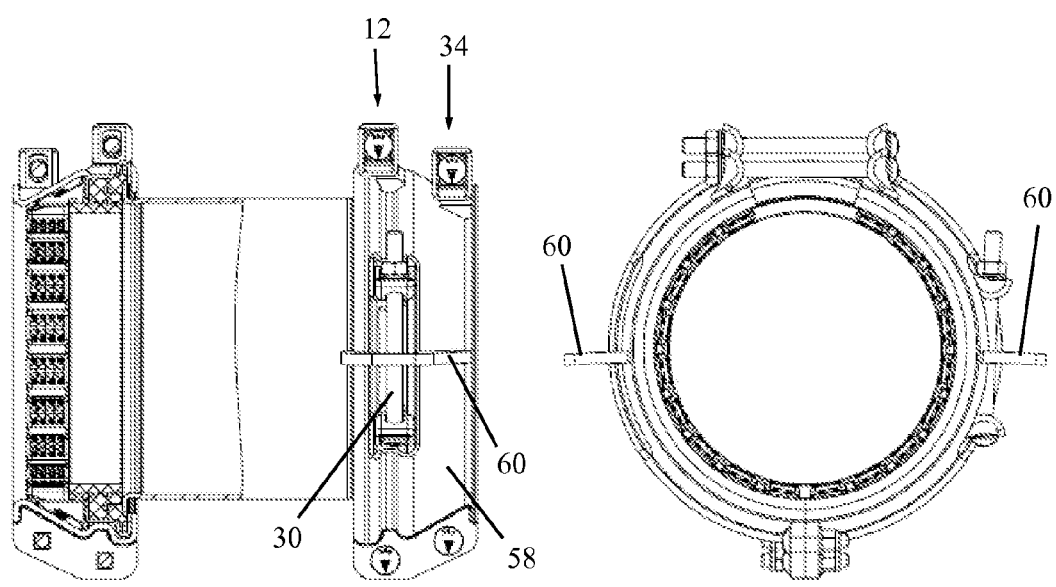
FIG. 5
FIG. 6

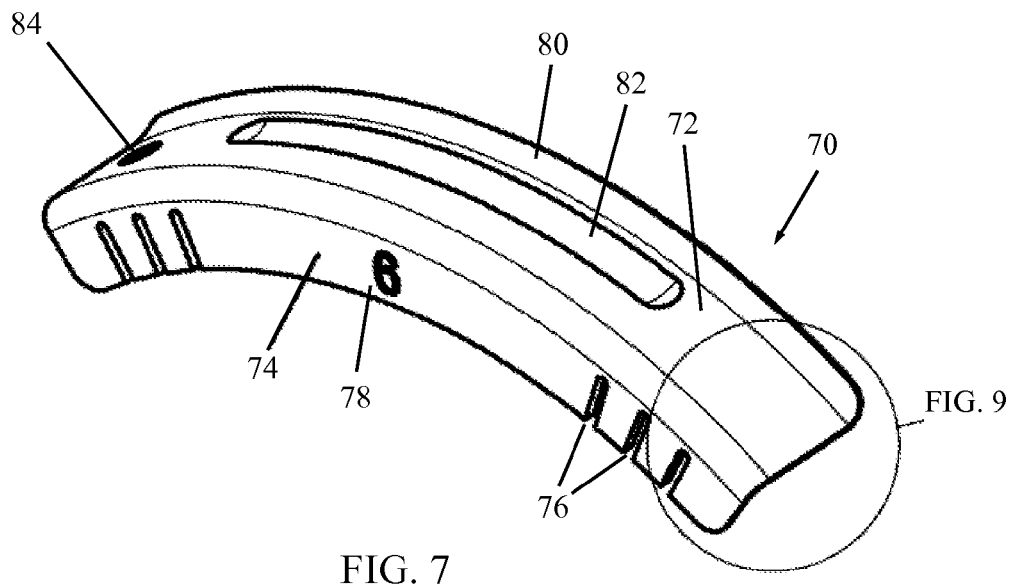
FIG. 7
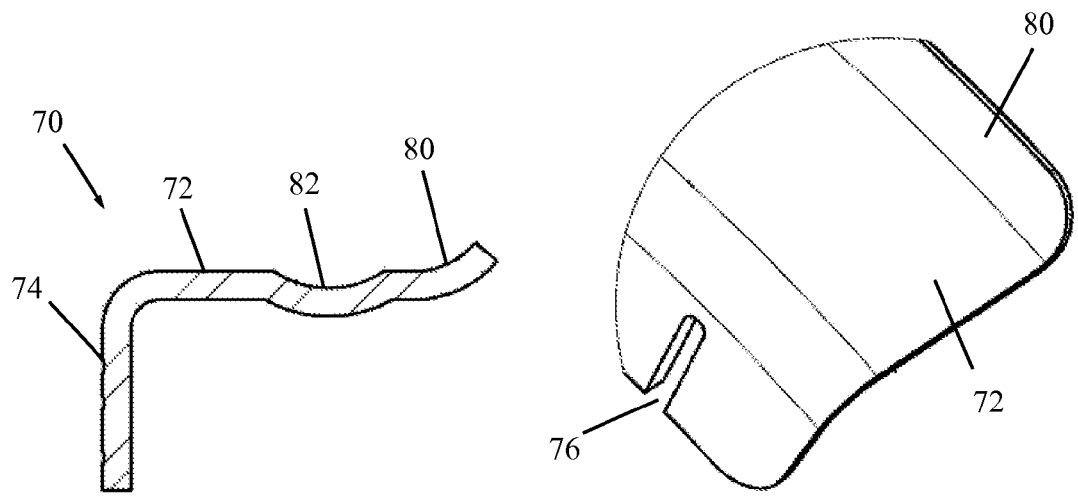
FIG. 8
FIG. 9

CLAMP ASSEMBLY WITH ANNULAR CLAMPS AND BRIDGE

FIELD OF THE INVENTION

The present invention relates generally to clamps and grip rings for pipes, and particularly to separately tightenable annular clamps, such as a pipe clamp and a grip ring assembly.

BACKGROUND OF THE INVENTION

Many kinds of removable band-type couplings for pipes exist in the art. It is noted that throughout the specification and claims, the term "pipe" encompasses any kind of generally cylindrical object.

There is no best coupling for all purposes, so users must choose the features required for a particular application, and then choose the lowest cost coupling meeting those specifications. The variables are many: diameter, diameter variability, degree of sealing required, fluid being transferred, hydraulic pressure, exposure to the outside or not, removable or permanent, weight limitations, space limitations, ease of installation and further factors all of which influence the selection of a coupling.

U.S. Pat. No. 6,293,556 to Krausz describes a coupling for connecting pipes of the same or different diameters. The coupling has a ring shaped seal made of rubber or other resilient material, constructed of a first ring seal seated over a second ring seal. The seals can be easily disconnecting from one another to allow sealing against different diameter pipes. For smaller diameter pipes, both the first and second ring seals are used; for larger diameters, only one seal is used.

U.S. Pat. No. 7,571,940 to Krausz describes another type of pipe coupling that combines an elastomeric seal member (similar, but not identical, to the seal of U.S. Pat. No. 6,293,556) with a grip ring. The grip ring is formed of wedge-shaped grip elements that are radially spaced from one another. The grip elements are formed with teeth that face inwards towards the center of the ring. A single fastener (e.g., bolt and nut or other tightenable screw) is provided, which when tightened in a direction transverse to the axial length of the pipe, presses both the elastomeric seal member and the grip ring against the surface of the pipe.

SUMMARY OF THE INVENTION

The present invention seeks to provide an improved clamp assembly that combines an elastomeric seal member with a grip ring assembly, but in contrast to U.S. Pat. No. 7,571,940, has a separate tightenable fastener for each of the elastomeric seal member and grip ring assembly. The improved clamp may provide the combination of separate fasteners, seals and grip rings as one unitary unit or as a kit that allows adding or removing the grip ring to the elastomeric seal member, as is described more in detail hereinbelow. The assembly of the present invention can be advantageously assembled and tightened on to a wide variety of diameters and materials of pipes (e.g., metal and plastic). In an alternative embodiment of the invention, instead of the combination of the elastomeric seal member and grip ring assembly, any combination of two annular clamps can be used. The clamp assembly has two adjacent annular clamps and the user has the choice of tightening just one of them or both of them.

There is thus provided in accordance with an embodiment of the present invention a clamp assembly including a first annular clamp having an opening at at least one end of its axial length for inserting therein a pipe, the first annular clamp including two clamp members, a first sealing ring operative to contact an outer contour of the pipe, and a first fastener, including a shank, operative to fasten the clamp members towards each other in a direction along the shank transverse to the axial length so as to apply a radially-inward clamping force on the first sealing ring so that the first annular clamp clamps the pipe, and a second annular clamp having an opening axially adjacent the opening of the first annular clamp for inserting therein the pipe, the second annular clamp including two clamp members, a second sealing ring operative to contact the outer contour of the pipe, and a second fastener, including a shank, operative to fasten the clamp members towards each other in a direction along the shank transverse to the axial length so as to apply a radially-inward clamping force on the second sealing ring so that the second annular clamp clamps the pipe.

In accordance with an embodiment of the present invention the first sealing ring includes inner and outer sealing rings radially spaced from one another, an innermost one of the sealing rings operative to contact the outer contour of the pipe.

In accordance with an embodiment of the present invention an annular inclined surface extends axially from each of the clamp members of the second annular clamp, and the second sealing ring includes a plurality of wedge-shaped grippers arranged for sliding and abutting against the annular inclined surface, the wedge-shaped grippers being connected to one another by flexible elements to form a grip ring, and the second fastener is operative to fasten the clamp members towards each other so as to apply a radially-inward clamping force on the annular inclined surface that moves and wedges the wedge-shaped grippers in an axial direction between the annular inclined surface and the pipe.

In accordance with an embodiment of the present invention the first and second annular clamps are mounted on a common annular housing.

In accordance with another embodiment of the present invention the second annular clamp is mounted on a separate annular housing that mounts onto the first annular clamp. In such an embodiment, the separate annular housing may include at least one axial flange that extends over a portion of the first annular clamp.

In accordance with an embodiment of the present invention at least one auxiliary fastener is opposite at least one of the first and second fasteners.

BRIEF DESCRIPTION OF THE DRAWINGS

The present invention will be understood and appreciated more fully from the following detailed description, taken in conjunction with the drawing in which:

FIGS. 1 and 2 are simplified pictorial and sectional illustrations, respectively, of a clamp assembly, constructed and operative in accordance with an embodiment of the present invention;

FIGS. 3, 4, 5 and 6 are simplified right perspective, left perspective, partially sectional and end-view illustrations, respectively, of a clamp assembly, constructed and operative in accordance with another embodiment of the present invention;

FIG. 7 is a simplified pictorial illustration of a bridge element, constructed and operative in accordance with an embodiment of the present invention, which helps keep the sealing ring in place when tightening the annular clamps;

FIG. 8 is a simplified sectional illustration of the bridge element;

FIG. 9 is an enlarged view of a portion of the bridge element; and

DETAILED DESCRIPTION OF EMBODIMENTS

Figures 10, 11:
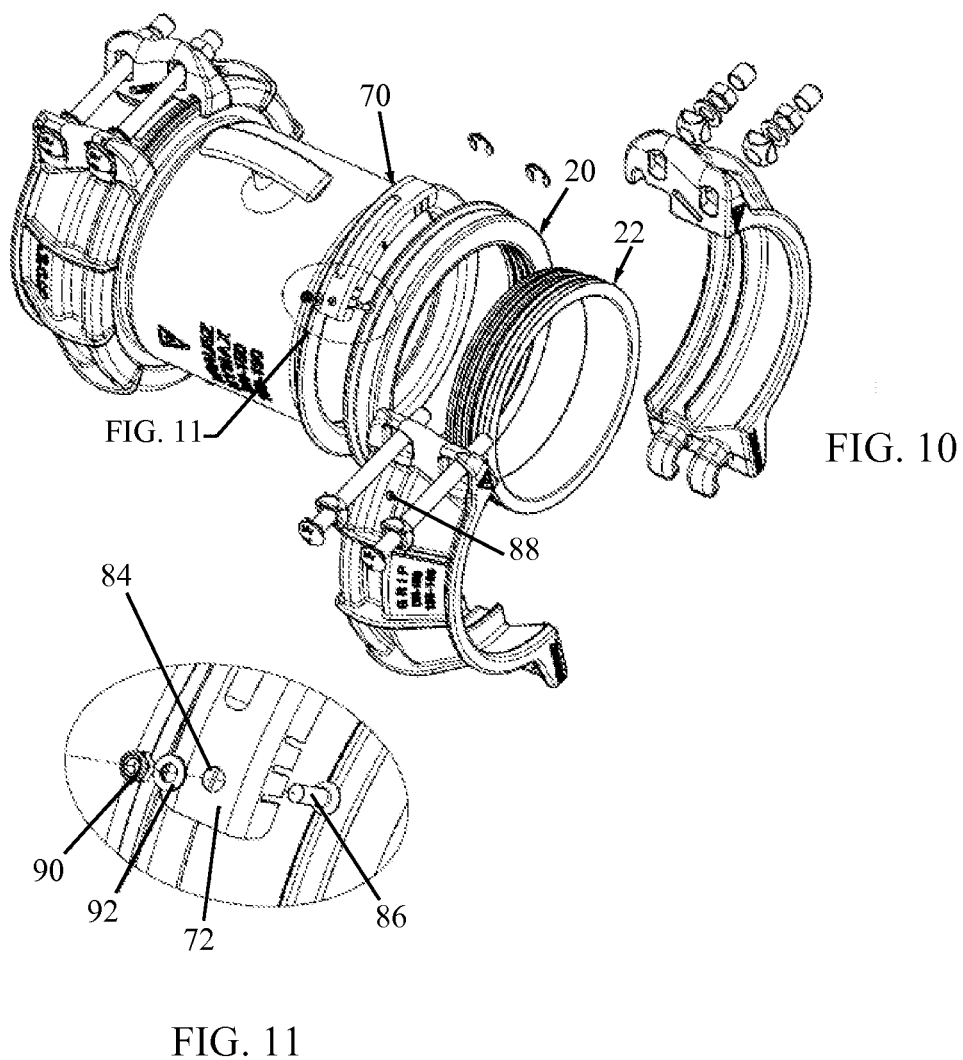
FIGS. 10 and 11 are simplified pictorial illustrations of the bridge element installed in the clamp assembly, in accordance with an embodiment of the present invention.

Reference is now made to FIGS. 1 and 2, which illustrate a clamp assembly 10, constructed and operative in accordance with a non-limiting embodiment of the present invention. Clamp assembly 10 combines an elastomeric seal member with a grip ring assembly as one unit. Another embodiment (FIGS. 3-6) has the combination in kit form.

Clamp assembly 10 includes a first annular clamp 12 having an opening 14 at at least one end (typically both ends) of its axial length for inserting therein a pipe (not shown). First annular clamp 12 including two clamp members 16 and 18, and a first sealing ring including inner and outer sealing rings 20 and 22 radially spaced from one another (FIG. 2). The outer sealing ring 22 includes an outer portion 24 folded over an inner portion 26 so as to define an inner space 28 between and bounded by the inner and outer portions 24 and 26. The inner space 28 is in fluid communication with a fluid (not shown) flowing in the pipe. The fluid enters inner space 28 and applies pressure therein to increase tightening of the seal.

The inner sealing ring 20 may be removed from or added to the outer sealing ring 22 to accommodate different pipe diameters; it is the innermost sealing ring that contacts the outer contour of the pipe and is tightened thereagainst. Tightening is accomplished by means of a first fastener 30, including a shank 32, which fastens the clamp members 16 and 18 towards each other in a direction along the shank 32 transverse to the axial length of the assembly (axial length of clamp housing 17) so as to apply a radially-inward clamping force on the innermost sealing ring that contacts the pipe so that the first annular clamp 12 clamps the pipe.

Clamp assembly 10 includes a second annular clamp 34 having an opening 36 adjacent opening 14 of first annular clamp 12 for inserting therein the pipe. Second annular clamp 34 includes two clamp members 38 and 40. An annular inclined surface 42 (FIG. 2) extends axially from each of clamp members 38 and 40, and extends over annular housing 52 that overlies outer sealing ring 22 of first annular clamp 12. A second sealing ring includes a plurality of wedge-shaped grippers 44, which are arranged for sliding and abutting against annular inclined surface 42. The wedge-shaped grippers 44 are connected to one another by flexible elements 46 to form a grip ring. A second fastener 48, including a shank 50, fastens clamp members 38 and 40 towards each other in a direction along shank 50 transverse to the axial length of the assembly so as to apply a radially-inward clamping force on the pipe inserted in the opening 36 and a radially-inward clamping force on annular inclined surface 42 that moves and wedges the wedge-shaped grippers 44 in an axial direction between annular inclined surface 42 and the pipe.

In the embodiment of FIGS. 1 and 2 the first and second annular clamps 12 and 34 are both mounted on annular inclined surface 42, which serves as a common annular housing 42. One or more auxiliary fasteners 54 (e.g., screws, bolts, hooks, rivets, nuts, etc.) are provided opposite the first and second fasteners 30 and 48 in a hinged flange 56, and are operative to tighten the annular housing 42.

When using the embodiment of FIGS. 1 and 2, the user has the choice of tightening just one or both of first and second annular clamps 12 and 34.

Reference is now made to FIGS. 3-6, which illustrate another clamp assembly 10A, in accordance with another embodiment of the present invention. Clamp assembly 10A differs from clamp assembly 10 in that the second annular clamp 34 is mounted on a separate annular housing 58 that mounts onto the first annular clamp 12. In such an embodiment, the separate annular housing 58 may include one or more axial flanges 60 that extend over a portion of first annular clamp 12. Clamp assembly 10A is provided as a kit to the user, who has the choice of assembling second annular clamp 34 on the first annular clamp 12 or not. FIGS. 3-6 show that flanges 60 may be positioned to straddle over first fastener 30 of first annular clamp 12.

Reference is now made to FIGS. 7-9, which illustrate a bridge element 70, constructed and operative in accordance with an embodiment of the present invention. Bridge element 70 helps keep the inner and outer sealing rings 20 and 22 in place when tightening the first annular clamp 12.

Bridge element 70 may be made of a suitably strong, yet bendable material, such as but not limited to, stainless steel (e.g., AISI 304). In accordance with an embodiment of the present invention, bridge element 70 combines strength/stiffness on its upper (outer radial) portion with flexibility on its lower (inner radial) portion, as is explained below.

Bridge element 70 includes a curved band 72, from which generally perpendicularly extends a side wall 74. Side wall 74 has a plurality of notches 76 formed therein. In the non-limiting illustrated embodiment, there are two groups of notches 76 located towards opposite ends of side wall 74. Side wall 74 may have an identification marking 78 on a portion thereof. Notches 76 provide flexibility to the lower part of bridge element 70, as will be explained more below.

Curved band 72 includes a stiffening flange 80, which may be formed by bending a portion of curved band 72 in a direction opposed to side wall 74. When bridge element 70 is installed in the clamp assembly 10, side wall 74 is directed generally radially inwards and stiffening flange 80 is directed slightly outwards. The stiffening flange 80 increases the stiffness and rigidity of the upper portion of bridge element 70, This is important so that bridge element 70 can press against the inner and outer sealing rings 20 and 22 when tightening the first annular clamp 12. In addition, curved band 72 may have an elongate depression 82 formed generally parallel to stiffening flange 80. The elongate depression 82 ensures that bridge element 70 firmly presses against the sealing rings.

Thus, bridge element 70 includes a relatively stiff, outer radial portion (curved band 72 with stiffening flange 80) and a relatively flexible, inner radial portion (side wall 74 with notches 76). The outer radial portion includes a pressing surface (elongate depression 82) for pressing against the sealing ring in the clamp assembly 10.

Curved band 72 is formed with a mounting hole 84 for mounting bridge element 70 in the clamp assembly 10, as will now be explained.

Reference is now made to FIGS. 10 and 11, which illustrate bridge element 70 installed in the clamp assembly 10, in accordance with an embodiment of the present invention.

Bridge element 70 may be fastened to a portion of first annular clamp 12 by means of a mechanical fastener, such as a bolt 86, which passes through a hole 88 formed in a portion of first annular clamp 12 and mounting hole 84 of curved band 72. The bolt 86 may be secured by a nut 90 and lock washer 92.

As mentioned before, first annular clamp 12 is tightened by means of first fastener 30, which fastens the clamp members 16 and 18 towards each other in a direction along the shank 32 transverse to the axial length of the assembly so as to apply a radially-inward clamping force on the innermost sealing ring that contacts the pipe so that the first annular clamp 12 clamps the pipe. This tightening operation diminishes the diameters of the sealing rings. Bridge element 70 must be flexible enough to accommodate this change in diameter. This is the reason for notches 76—as the clamp members 16 and 18 are tightened and drawn towards each other, the sides of each of the notches 76 are squeezed towards each other and this compensates for the decrease in diameter.

The scope of the present invention includes both combinations and subcombinations of the features described hereinabove as well as modifications and variations thereof which would occur to a person of skill in the art upon reading the foregoing description and which are not in the prior art.

What is claimed is:

1. A clamp assembly comprising:
a first annular clamp having an opening at at least one end of an axial length for inserting therein a pipe, said first annular clamp comprising two clamp members; a first sealing ring operative to contact an outer contour of the pipe; and a first fastener, comprising a shank, operative to fasten said clamp members towards each other in a direction along said shank transverse to the axial length so as to apply a radially-inward clamping force on said first sealing ring so that said first annular clamp clamps the pipe; and
a separate second annular clamp having an opening axially adjacent said opening of said first annular clamp for inserting therein the pipe, said second annular clamp comprising two clamp members axially adjacent said clamp members of said first annular clamp; a second sealing ring operative to contact the outer contour of the pipe; and a second fastener, comprising a shank, operative to fasten said clamp members towards each other in a direction along said shank transverse to the axial length so as to apply a radially-inward clamping force on said second sealing ring so that said second annular clamp clamps the pipe; and
a bridge element fastened to a portion of said first annular clamp, said bridge element comprising a relatively stiff, outer radial portion and a relatively flexible, inner radial portion, said outer radial portion comprising a pressing surface for pressing against said first sealing ring, said outer radial portion comprising a curved band with a stiffening flange and wherein a side wall extends generally perpendicularly from said curved band, said side wall having a plurality of notches formed therein.

2. The clamp assembly according to claim 1, wherein said pressing surface comprises an elongate depression formed in said curved band.

3. The clamp assembly according to claim 2, wherein said elongate depression is generally parallel to said stiffening flange.

4. The clamp assembly according to claim 1, wherein two groups of notches are located towards opposite ends of said side wall.

5. The clamp assembly according to claim 1, wherein said stiffening flange extends from said curved band in a direction opposed to said side wall.

6. The clamp assembly according to claim 1, wherein said bridge element is formed with a mounting hole.

7. The clamp assembly according to claim 1, wherein said bridge element comprises an identification marking on a portion thereof.

\* \* \* \* \*